(12) United States Patent
Moggio et al.

(10) Patent No.: US 12,142,018 B2
(45) Date of Patent: Nov. 12, 2024

(54) VIDEO STITCHING METHOD AND SYSTEM

(71) Applicant: Telecom Italia S.p.A., Milan (IT)

(72) Inventors: Fabrizio Moggio, Turin (IT); Nicola Reale, Turin (IT); Andrea Varesio, Turin (IT); Marco Vecchietti, Turin (IT)

(73) Assignee: Telecom Italia S.p.A., Milan (IT)

( * ) Notice: Subject to any disclaimer, the term of this patent is extended or adjusted under 35 U.S.C. 154(b) by 65 days.

(21) Appl. No.: 17/777,537

(22) PCT Filed: Nov. 10, 2020

(86) PCT No.: PCT/EP2020/081594
§ 371 (c)(1),
(2) Date: May 17, 2022

(87) PCT Pub. No.: WO2021/099178
PCT Pub. Date: May 27, 2021

(65) Prior Publication Data
US 2024/0029386 A1  Jan. 25, 2024

(30) Foreign Application Priority Data
Nov. 18, 2019 (IT) .......................... 102019000021399

(51) Int. Cl.
*G06V 10/10* (2022.01)
*G06T 7/194* (2017.01)
(Continued)

(52) U.S. Cl.
CPC .............. *G06V 10/16* (2022.01); *G06T 7/194* (2017.01); *G06V 10/25* (2022.01); *H04N 5/272* (2013.01)

(58) Field of Classification Search
CPC ........ G06V 10/16; G06V 10/25; G07T 7/194; H04N 5/272
See application file for complete search history.

(56) References Cited

U.S. PATENT DOCUMENTS

| | | | |
|---|---|---|---|
| 6,577,333 B2 | 6/2003 | Tai et al. | |
| 2009/0122195 A1* | 5/2009 | van Baar | H04N 5/2627 348/584 |

(Continued)

OTHER PUBLICATIONS

M. Brown and D. Lowe, "Automatic Panoramic Image Stitching using Invariant Features", International Journal of Computer Vision, 74(1), pp. 59-73, 2007.

(Continued)

*Primary Examiner* — Terrell M Robinson
(74) *Attorney, Agent, or Firm* — Banner & Witcoff, Ltd.

(57) ABSTRACT

A video communication system adapted to interface with video cameras for receiving respective video signals therefrom. The video communication system includes a frame extractor module for extracting from each video signal received from the video cameras a corresponding sequence of video frames, each sequence comprising a first sequence portion comprising background frames shooting background and a subsequent second sequence portion comprising frames shooting a foreground subject; a panoramic video generation module configured to receive the frames of the second sequence portion of each sequence of frames, the panoramic video generation module for executing following sequence of operations every time new video frames of the second sequence portion are received: select a corresponding dominant video camera among the plurality of video cameras based on the received new video frames, processing the received new video frames to generate corresponding operative seam masks for stitching together the new video frames.

20 Claims, 5 Drawing Sheets

(51) Int. Cl.
*G06V 10/25* (2022.01)
*H04N 5/272* (2006.01)

(56) References Cited

U.S. PATENT DOCUMENTS

| | | | |
|---|---|---|---|
| 2012/0293606 A1 | 11/2012 | Watson et al. | |
| 2013/0063614 A1* | 3/2013 | Tsutsumi | H04N 23/68 |
| | | | 348/208.4 |
| 2016/0088287 A1* | 3/2016 | Sadi | H04N 5/265 |
| | | | 348/43 |
| 2018/0012335 A1* | 1/2018 | Adsumilli | H04N 23/698 |
| 2019/0089941 A1* | 3/2019 | Bigioi | G06T 7/593 |
| 2022/0180475 A1* | 6/2022 | Miyashita | G06T 7/194 |

OTHER PUBLICATIONS

Vivek Kwatra, Arno Schodl, Irfan Essa, Greg Turk, and Aaron Bobick, "Graphcut Textures: Image and Video Synthesis Using Graph Cuts", GVU Center/College of Computing, Georgia Institute of Technology, Proc. ACM Transactions on Graphics, SIGGRAPH 2003.

OpenCV 2.4.13.7 documentation page "Image stitching" available at http://docs.opencv.org/2.4/modules/stitching/doc/introduction.html.

Jing Dong and Haibo Liu, "Video Stabilization for Strict Real-Time Applications", IEEE Transactions on Circuits and Systems for Video Technology, vol. 27, Issue 4, Apr. 2017.

Zoran Zivkovic, "Improved Adaptive Gaussian Mixture Model for Background Subtraction", Intelligent and Autonomous Systems Group, University of Amsterdam, the Netherlands, in Proc. ICPR, 2004.

Peter J. Burt and Edward H. Adelson, "A Multiresolution Spline with Application to Image Mosaics", RCA David Sarnoff Research Center, ACM Transactions on Graphics, vol. 2, No. 2, Oct. 1983.

K. Cordes, B. Rosenhahn and J. Ostermann, "Localization accuracy of interest point detectors with different scale space representations", in 2014 11th IEEE International Conference on Advanced Video and Signal Based Surveillance (AVSS).

Hongming Zhang et al: "Foreground Based Borderline Adjusting for Real Time Multi-camera Video Stitching", Image and Graphics, Fifth International Conference on, IEEE, Piscataway, NJ, USA, Sep. 20, 2009 (Sep. 20, 2009), pp. 355-360, XP031652743.

Nummiaro K et al: "Color-Based Object Tracking in Multi-camera Environments", Electronic Publishing, Artistic Imaging, and Digital Typography; [Lecture Notes in Computer Science, ISSN 0302-9743], Springer Verlag. DE, vol. 2781, Jan. 1, 2003 (Jan. 1, 2003), pp. 591-599, XP002391170.

Feb. 16, 2021—(WO) International Search Report and Written Opinion—App PCT/EP2020/081594.

* cited by examiner

VIDEO STITCHING METHOD AND SYSTEM

BACKGROUND OF THE INVENTION

Field of the Invention

The present invention relates to the field of telecommunications, particularly to the field of video communication, and more particularly it relates to a method and a system for generating a panoramic video during a video communication.

Overview of the Related Art

As it is known to those skilled in the art, "image stitching" is a technique which combines a plurality of images with overlapping fields of view taken by means of a camera in order to generate a panoramic image (or simply panorama) corresponding to an overall field of view wider than the one allowable by the optical system of the camera.

Through modern image stitching techniques it is possible to generate a panoramic image starting from a plurality of images without having to impose particularly strict constraints on the way each image is taken. Indeed, even if the images are taken with different horizon lines and with different exposures, the image stitching techniques provide for processing the images to find how to deform and cut them in order to optimize the operations for joining the images so as to obtain a panoramic image, minimizing seam artifacts.

Briefly, image stitching techniques comprise a so called graph-cut procedure that provides for calculating for each image a corresponding mask (also referred to as "seam mask") adapted to be superimposed on the image. Each seam mask comprises one or more curves (globally referred to as "graph cut") subdividing the seam mask area in portions of two types, and particularly:
- the portions of the seam mask of the first type ("remove portions") define, when the seam mask is superimposed on the corresponding image, corresponding portions of the image to be cut out for being removed;
- the portions of the seam mask of the second type ("keep portions") define, when the seam mask is superimposed on the corresponding image, corresponding portions of the image to be kept.

The masks are applied to the corresponding images to be stitched, and the portions of each image which are covered by remove portions of the respective seam mask are cut out and removed.

Then, the remaining portions of the various images (i.e., the portions thereof which are covered by keep portions of the respective seam mask) are joined to each other to form a panoramic image.

Known examples of said image stitching techniques are provided in "*Automatic Panoramic Image Stitching using Invariant Features*" by M. Brown and D. Lowe, International Journal of Computer Vision, 74(1), pages 59-73, 2007, "*Graphcut Textures: Image and Video Synthesis Using Graph Cuts*" by Vivek Kwatra, Arno Schodl, Irfan Essa, Greg Turk, and Aaron Bobick, GVU Center/College of Computing, Georgia Institute of Technology, Proc. ACM Transactions on Graphics, SIGGRAPH 2003, and in the OpenCV 2.4.13.7 documentation page "Image stitching" available at http://docs.opencv.org/2.4/modules/stitching/doc/introduction.html.

By exploiting the high computational power of modern electronic devices, it is now possible to take advantage of the abovementioned image stitching techniques also in the video field. For example, having a plurality of videos each one shot by a respective video camera, frames of different videos corresponding to a same time may be stitched together to generate frames of a resulting compound video, referred to as "panoramic video". The stitching of frames may be carried out by using one of the known image stitching techniques suitably modified to introduce video stabilization features (such as for example the one shown in "*Video Stabilization for Strict Real-Time Applications*" by Jing Dong and Haibo Liu, IEEE Transactions on Circuits and Systems for Video Technology, Volume 27, Issue 4, April 2017) directed to reduce hand-shake disturbances which may impair the quality of the resulting compound video.

One of the most interesting fields in which video stitching techniques can be applied is the field of video communication, such as video conferencing or video transmission, wherein a video transmission (unidirectional communication), or bidirectional communication, is established between two (or more) individuals, subjects and/or entities in which at least one individual, subject or entity on the transmitting side (hereinafter, "actor") is being shot by a plurality of (e.g., two) video cameras, a panoramic video is generated from the videos shot by the plurality of video cameras, and the panoramic video is transmitted to the receiving side, e.g. to viewers, or to other actor(s) of a bidirectional communication, e.g., of a video conference session.

Paper "*Improved Adaptive Gaussian Mixture Model for Background Subtraction*" by Zoran Zivkovic, Intelligent and Autonomous Systems Group, University of Amsterdam, The Netherlands, in Proc. ICPR, 2004, analyzes a pixel-level approach for a background subtraction computer vision task. An adaptive algorithm is developed using Gaussian mixture probability density in which recursive equations are used to constantly update the parameters and to simultaneously select an appropriate number of components for each pixel.

Paper "*A Multiresolution Spline with Application to Image Mosaics*" by Peter J. Burt and Edward H. Adelson, RCA David Sarnoff Research Center, ACM Transactions on Graphics, Vol. 2, No. 2, October 1983, defines a multiresolution spline technique for combining two or more images into a larger image mosaic. The procedure provides for having the images to be splined that are first decomposed into a set of band-pass filtered component images. Next, the component images in each spatial frequency band are assembled into a corresponding bandpass mosaic. In this step, component images are joined using a weighted average within a transition zone which is proportional in size to the wave lengths represented in the band. Finally, these bandpass mosaic images are summed to obtain the desired image mosaic. In this way, the spline is matched to the scale of features within the images themselves. When coarse features occur near borders, these are blended gradually over a relatively large distance without blurring or otherwise degrading finer image details in the neighborhood of the border.

SUMMARY OF THE INVENTION

The Applicant has found that the known solutions cited above are not particularly suited for being efficiently used during a video communication for the following reasons.

If more than one video cameras are provided for shooting an actor during a video communication, each video camera generates a corresponding video of the actor taken from a different point of view (i.e., form a different position and/or angle). For this reason, if the actor moves during the video communication, it may happen that one or more of the video cameras shoot the actor only partially. Since currently available image stitching techniques are not sufficiently developed to efficiently stitch together partial depictions of human beings from different points of views, the resulting panoramic video will comprise a very distorted depiction of the actor. This drawback is particularly inconvenient in case of video communications, because during a video communication, the most important element to be displayed is usually the actor.

In view of the above, the Applicant has devised a solution for improving the quality of a panoramic video by reducing the occurrences of distortions when the actor is shoot only partially by one or more video cameras.

An aspect of the present invention relates to a video communication system. The video communication system is adapted to be interfaced with a plurality of video cameras for receiving respective video signals therefrom.

According to an embodiment of the present invention, the video communication system comprises a frame extractor module configured to extract from each video signal received from the video cameras a corresponding sequence of video frames.

According to an embodiment of the present invention, each sequence of video frames comprises a first sequence portion comprising background video frames shooting background only and a subsequent second sequence portion comprising video frames shooting also a foreground subject.

According to an embodiment of the present invention, the system comprises a panoramic video generation module configured to receive the video frames of the second sequence portion of each sequence of video frames.

According to an embodiment of the present invention, the panoramic video generation module is configured to carry out the following sequence of operations every time new video frames of the second sequence portion of each sequence of video frames are received:
  selecting a corresponding dominant video camera among the plurality of video cameras based on the received new video frames, the dominant video camera being the video camera having the best point of view of the foreground subject and
  processing the received new video frames to generate corresponding operative seam masks to be used for stitching together the new video frames;

According to an embodiment of the present invention, the system further comprises a background module configured to receive the background video frames of the first sequence portion of each sequence of video frames and to generate for each video camera a corresponding set of background seam masks according to the received background video frames.

According to an embodiment of the present invention, each seam mask among the operative seam masks and background seam masks has a respective area and comprises a graph cut subdividing the seam mask area into:
  remove area portions defining, when the seam mask is superimposed on a video frame, corresponding area portions of the video frame to be cut out for being removed, and
  keep area portions defining, when the seam mask is superimposed on a video frame, corresponding area portions of the video frame to be kept.

According to an embodiment of the present invention, each set of background seam masks corresponding to a video camera comprises background seam masks to be used for stitching together video frames of the second sequence portion when the video camera is selected as the dominant video camera.

According to an embodiment of the present invention, the panoramic video generation module is further configured to carry out the following operations every time new video frames of the second portion of each sequence of video frames are received:
  selecting the set of background seam masks corresponding to the dominant video camera;
  generating combined masks by combining the background seam masks of the selected set with the operative seam masks;
  generating a panoramic video frame by stitching together the received new video frames by removing therefrom area portions using the combined masks.

According to an embodiment of the present invention, the panoramic video generation module is configured to process the received new video frames to generate corresponding operative seam masks through a graph cut procedure providing for scanning overlapping pixels in the received new video frames and calculating a graph cut which causes lowest junction distortions through the minimization of a cost function regarding the Euclidean distance among pixels astride the graph cut.

According to an embodiment of the present invention, the panoramic video generation module is further configured to generate the panoramic video frame by overlapping the received new video frames with the received new video frame corresponding to the dominant video camera having a z-order (i.e., the overlapping order) higher than the z-order of the other received new video frames.

According to an embodiment of the present invention, the background module is further configured to generate for each video camera a corresponding set of background seam masks through a graph cut procedure providing for scanning overlapping pixels in the background video frames and calculating a graph cut which causes lowest junction distortions through the minimization of a cost function regarding the Euclidean distance among pixels astride the graph cut.

According to an embodiment of the present invention, the graph cut procedure is modified to take into account that video frames corresponding to the video camera corresponding to the set of background seam masks have a z-order higher than the z-order of video frames corresponding to other video cameras.

According to an embodiment of the present invention, the graph cut procedure performed by the background module provides for limiting the graph cut to portions of background video frames that are intended to overlap to each other.

According to an embodiment of the present invention, the panoramic video generation module is further configured to generate the combined masks by carrying out a logic AND operation between the background seam masks of the selected set and the operative seam masks.

According to an embodiment of the present invention, the panoramic video generation module is configured to select a corresponding dominant video camera among the plurality of video cameras based on the received new video frames by carrying out the following operations:
  calculate for each video frame among the received new video frames bounding boxes each one enclosing a foreground object identified in the video frame;
  identifying the video frame comprising the bounding box having the largest area among the received new video frames;

selecting the dominant video camera as the video camera corresponding to the identified video frame comprising the bounding box having the largest area.

According to an embodiment of the present invention, the system further comprises a transmitter module configured to transmit the panoramic video frame to a receiver module.

Another aspect of the present invention relates to a method for generating a panoramic video, comprising:

receiving video signals each one from a respective video camera among a plurality of video cameras;

extracting from each received video signal a corresponding sequence of video frames, each sequence of video frames comprising a first sequence portion comprising background video frames shooting background only and a subsequent second sequence portion comprising video frames shooting also a foreground subject;

carrying out the following sequence of operations every new video frame of the second sequence portion of each sequence of video frames:

selecting a corresponding dominant video camera among the plurality of video cameras based on the new video frames, the dominant video camera being the video camera having the best point of view of the foreground subject and processing the new video frames to generate corresponding operative seam masks to be used for stitching together the new video frames;

generating for each video camera a corresponding set of background seam masks according to the background video frames, wherein:

each seam mask among the operative seam masks and background seam masks has a respective area and comprises a graph cut subdividing the seam mask area into:

remove area portions defining, when the seam mask is superimposed on a video frame, corresponding area portions of the video frame to be cut out for being removed, and keep area portions defining, when the seam mask is superimposed on a video frame, corresponding area portions of the video frame to be kept, each set of background seam masks corresponding to a video camera comprises background seam masks to be used for stitching together video frames of the second sequence portion when the video camera is selected as the dominant video camera, the method further comprising:

carrying out the following operations for every new video frame of the second portion of each sequence of video frames:

selecting the set of background seam masks corresponding to the dominant video camera;

generating combined masks by combining the background seam masks of the selected set with the operative seam masks;

generating a panoramic video frame by stitching together the new video frames by removing therefrom area portions using the combined masks.

According to an embodiment of the present invention, the method further comprises processing the new video frames to generate corresponding operative seam masks through a graph cut procedure providing for scanning overlapping pixels in the new video frames and calculating a graph cut which causes lowest junction distortions through the minimization of a cost function regarding the Euclidean distance among pixels astride the graph cut.

According to an embodiment of the present invention, the method further comprises generating the panoramic video frame by overlapping the new video frames with the new video frame corresponding to the dominant video camera having a z-order higher than the z-order of the other new video frames.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION

Figure 1:
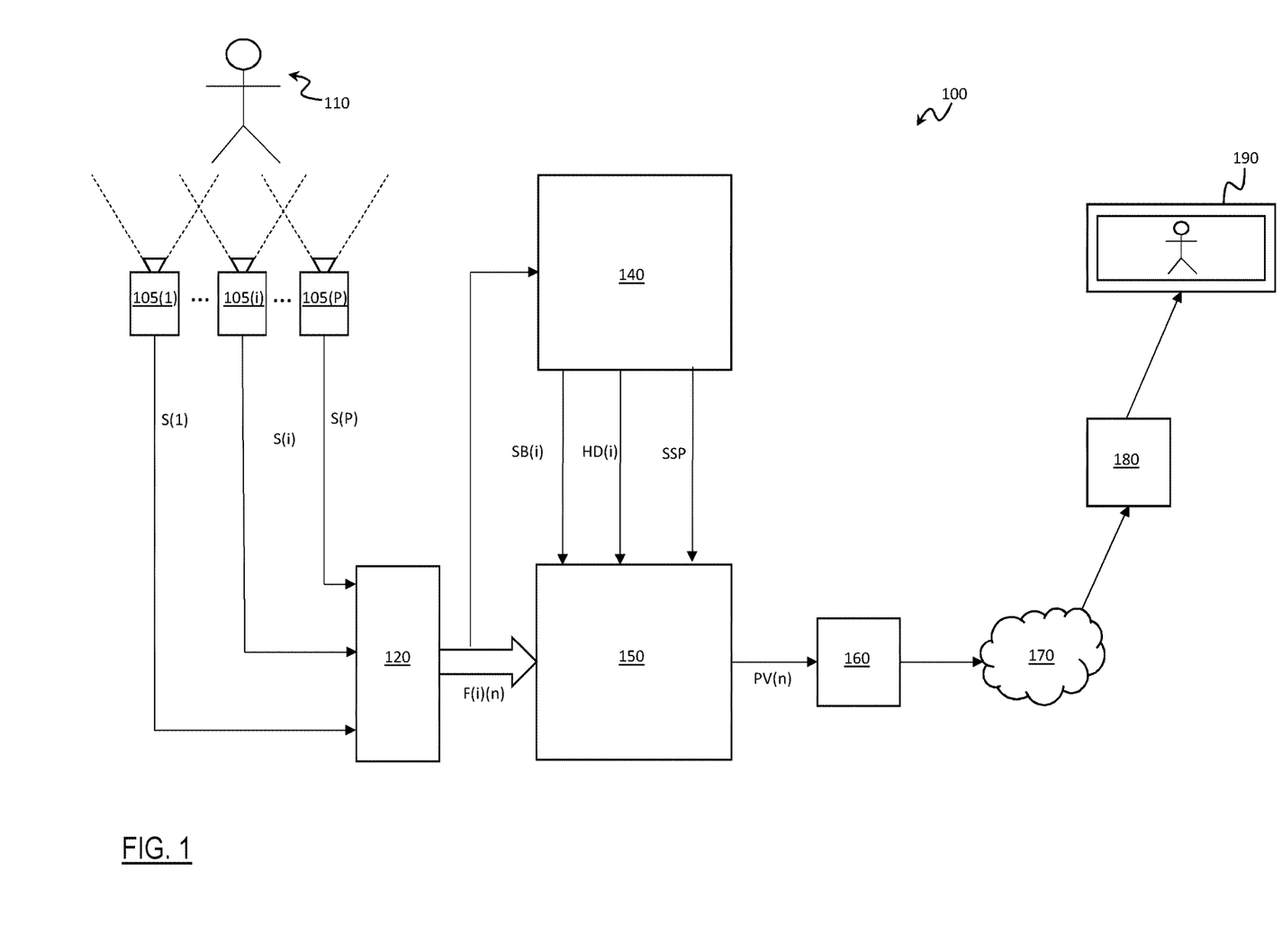
FIG. 1 illustrates in terms of functional modules a panoramic video communication system according to an embodiment of the present invention.

FIG. 1 illustrates in terms of functional modules a panoramic video communication system 100 (hereinafter simply referred to as "system") according to an embodiment of the present invention.

It should be noted that the terms 'unit', 'system' or 'module' are herein intended to comprise, but not limited to, hardware, firmware, a combination of hardware and software, software.

For example, a unit, system or module may be, but is not limited to being, a process running on a processor, a processor, an object, an executable, a thread of execution, a program, and/or a computing device.

In other words, a unit, system or module may comprise an application being executed on a computing device and/or the computing device itself.

One or more units, systems or modules may be localized on one computing device and/or distributed between two or more computing devices.

Units, systems or modules may comprise and/or interact with computer readable media storing data according to various data structures.

The units, systems or modules may communicate by exploiting local and/or remote processes, preferably by means of electrical, electromagnetic and/or optical signals providing one or more data packets, such as data packets from one unit, system or module interacting with another unit, system or module in a local system, in a distributed system, and/or across a radio network and/or a wired network.

The system 100 is adapted to be interfaced with a plurality of P video cameras 105(*i*) (1=1, 2, ..., P) for receiving respective video signals S(i) therefrom.

The video cameras 105(*i*) are arranged according to an array (each video camera 105(*i*) is spaced apart from the others by predetermined distances) for shooting an actor 110 of a video communication through partially overlapping field of views. The camera array can be a linear array, in which the video cameras 105(*i*) are aligned along a line, a bi-dimensional array, in which the video cameras 105(*i*) are arranged along a plane, or a tri-dimensional array, such as for example in case the video cameras 105(*i*) are arranged along two or more planes.

The system 100 comprises a frame extractor module 120 adapted to receive the video signals S(i) generated by the video cameras 105(*i*) and extract therefrom corresponding sequences of N+1 video frames F(i)(n) (n=0, 1, ..., N), wherein video frame F(i)(n) is the n-th video frame generated by the i-th video camera 105(*i*) while shooting during time instant t(n).

As will be described in detail in the following of the present description, each sequence of video frames F(i)(n) generated by a video camera 105(*i*) is subdivided into a preliminary first frame sequence portion SP1(*i*) in which the actor 110 is not being shot by the video camera, and the video communication is not started yet, followed by a second frame sequence portion SP2(*i*) in which the actor 110 is being shot by the video camera during the video communication.

The first frame sequence portion SP1(*i*) comprises n'+1 video frames F(i)(0), F(i)(1), ... F(i)(n'), wherein F(i)(0) is the first video frame acquired by the video camera 105(*i*) when the latter started to shoot (time instant t(0)), and F(i)(n') is the last video frame acquired by the video camera 105(*i*) before the actual start of the video communication (time instant t(n)).

The second frame sequence portion SP2(*i*) comprises N−n' video frames F(i)(n'+1), ..., F(i)(N), wherein F(i)(n'+1) is the first video frame acquired by the video camera 105(*i*) during the video communication (time instant t(n'+1)), and F(i)(N) is the last video frame acquired by the video camera 105(*i*) before the end of the video communication (time instant t(N)).

Since the video frames F(i)(0), F(i)(1), ... F(i)(n') of the first set SP1(*i*) display only the background of the scene, because no actor is present yet, the video frames will be also referred to as "background video frames".

As will be described in greater detail in the following of the present description, the system 100 according to an embodiment of the present invention is configured in such a way that during the second frame sequence portion SP2(*i*) (i.e., when the actor is shot), at each time t(n), a "dominant" video camera (or adjacent video cameras, for example in case of multiple actors) is selected among the video cameras 105(*i*) based on the position of the actor with respect to the video cameras 105(*i*). According to an embodiment of the present invention, a video camera is selected to be the dominant video camera at time t(n) if such video camera is the one among the video cameras 105(*i*) that at time t(n) is better shooting the actor, i.e., the video camera that has the best point of view of the actor. For example, according to an embodiment of the present invention that will be described in the following, the dominant video camera is the one that, compared to the other video cameras, is shooting a larger portion of the body (or of a selected relevant part thereof) of the actor.

As will be described in greater detail in the following of the present description, according to an embodiment of the present invention, the system 100 is configured to stitch video frames F(i)(n) generated at time t(n) by the video cameras 105(*i*) by setting the z-order (i.e., the overlapping order: when two windows overlap, their z-order determines which one appears on top of the other) of the video frames F(i)(n) to be stitched based on which video camera is the dominant one. By identifying with 105(*i*') the dominant video camera at time t(n), the video frame F(i')(n) generated by the dominant video camera 105(*i*') will be stitched over the other video frames F(i)(n) generated by the (non-dominant) video cameras 105(*i*), i.e., with the z-order of the video frame F(i')(n) that is higher than the z-order of the other video frames F(i)(n).

According to an embodiment of the present invention which will be described in detail in the following of the description, the system 100 comprises a background module 140 configured to receive the video frames F(i)(n) of the first frame sequence portions SP1(*i*) (i=1, ..., P) generated by the P video cameras 105(*i*) and to process at least a portion thereof in order to generate:

For each video camera 105(*i*), a corresponding set of homographic data HD(i) describing the video camera itself.

For each video camera 105(*i*), a corresponding set SB(i) of P background seam masks $BSM_i(j)$ (j=1, ... P) to be used for processing the P video frames F(i)(n) generated at time t(n) when at time t(n) the i-th video camera 105(*i*) is the dominant video camera. As will be described in detail in the following, the j-th background seam mask $BSM_i(j)$ of the set SB(i) is configured to be exploited for processing the video frame generated by the video camera 105(*j*) (j=1, ... P) when the i-th video camera 105(*i*) is the dominant video camera. Therefore, a group of P sets SB(i) (i=1, ..., P) is generated, wherein each one of the sets SB(i) comprises in turn P background seam masks $BSM_i(j)$ (j=1, ..., P). According to an embodiment of the present invention, each time a new set of P video frames F(1)(*n*), ..., F(i)(n), ..., F(P)(n) of the second frame sequences portion SP2(*i*) (i=1 to P) corresponding to a time instant t(n) are received by the system 100, and a video camera 105(*i*') is selected to be dominant video camera, the set SB(i') of background seam masks corresponding to the dominant video camera 105(*i*') is selected among the available sets SB(i), and the corresponding background seam masks $BSM_i(j)$ of such selected set SB(i') are used for processing such video frames F(1)(*n*), ..., F(i)(n), ..., F(P)(n).

A seam scale parameter SSP indicative of a scale to be employed for calculating operative seam masks SM(i, n) to be applied (together with the background seam masks $BSM_i(j)$ of the selected set SB(i')) to the video frames F(i)(n) of the second frame sequence portions SP2(*i*).

The system 100 further comprises a panoramic video generation module 150 configured to receive the video frames F(i)(n) of the first and second frame sequence portions SP1(*i*), SP2(*i*), and to process them by exploiting the set of homography data HD(i), the sets SB(i) of background seam masks $BSM_i(j)$ and the seam scale parameter SSP generated by the background module 140 in order to generate a corresponding panoramic video comprising a sequence of panoramic video frames PV(n) (n=0, 1, ..., N) each one obtained by stitching together properly processed versions of portions of the video frames F(i)(n) acquired by the video cameras 105(*i*) at the time instant t(n). As will be described in detail in the following of the description, according to an embodiment of the present invention, the portions of the video frames F(i)(n) to be stitched together are selected and processed by exploiting calculated operative seam masks SM(i, n) properly transformed and combined with background seam masks $BSM_{i'}(j)$ of the selected set SB(i') of background seam masks.

A transmitter module 160 is configured to transmit the panoramic video frames PV(n), for example through a communication network 170, such as the Internet, to a receiver module 180, which sends the received panoramic video frames PV(n) to a display unit 190 (e.g., a pc monitor or a smartphone display) for being displayed.

Figure 2A:
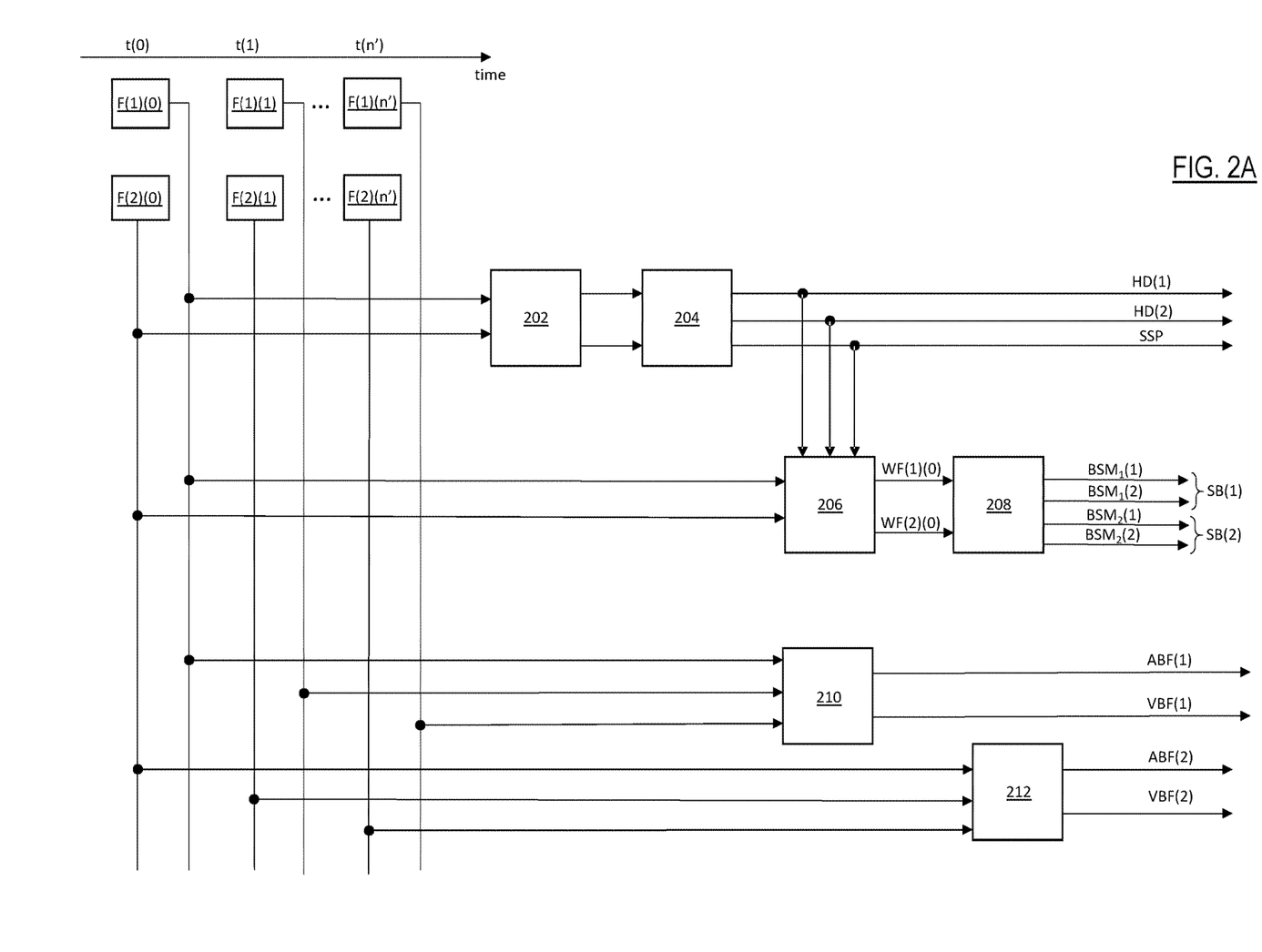
FIGS. 2A and 2B illustrate in terms of functional blocks the main operations carried out by the panoramic video communication system of FIG. 1 according to an embodiment of the present invention.
Figure 2B:
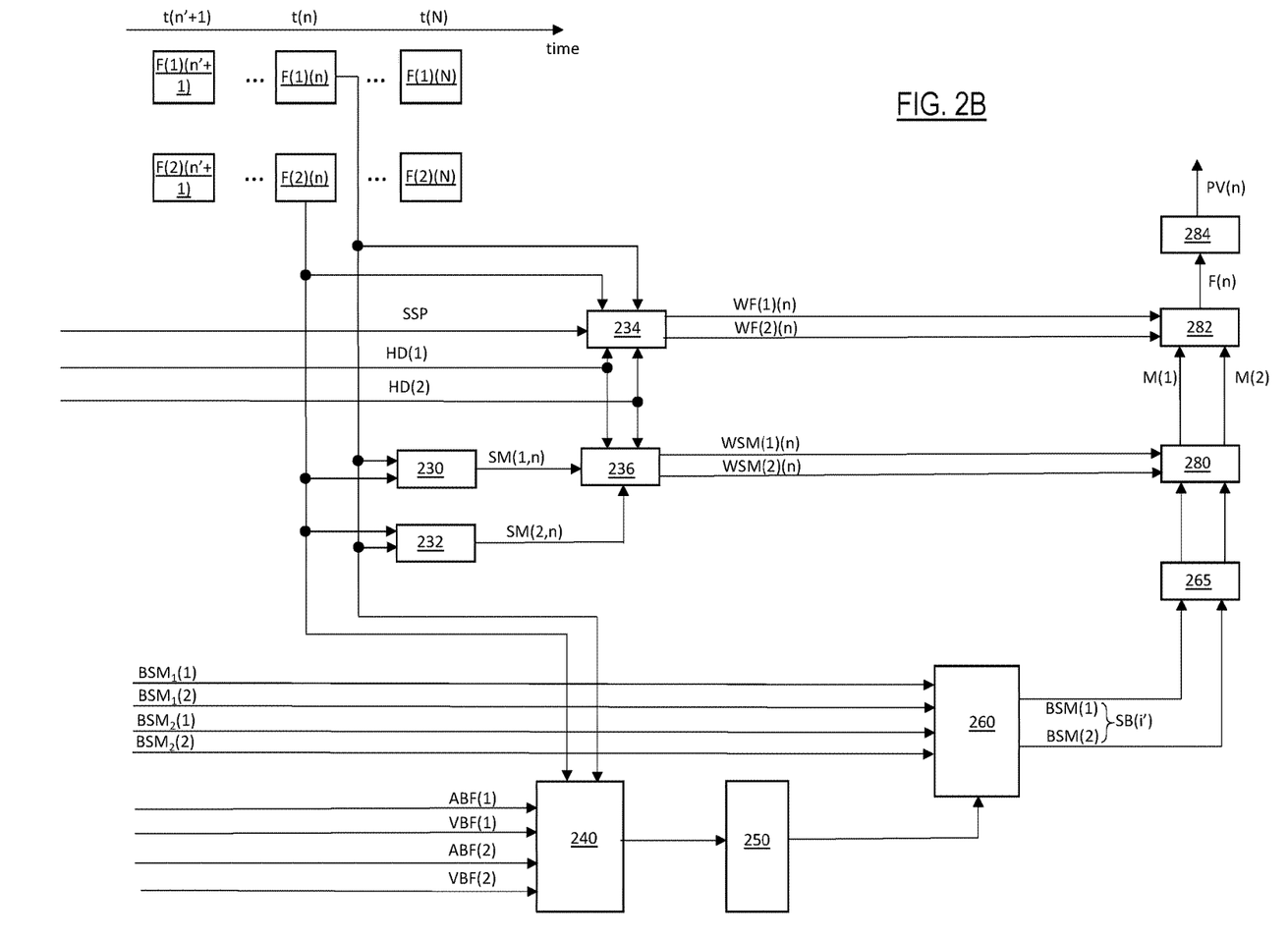

FIGS. 2A and 2B illustrate in terms of functional blocks the main operations carried out by the system 100 according to an embodiment of the present invention.

FIG. 2A illustrates the operations carried out by the background module 140 when receiving the first frame sequence portions SP1(*i*) from each video camera 105(*i*) during a preliminary phase starting at time instant t(0) and ending at time instant t(n'), i.e., when the video conference is not started yet, and the actor is not being shot.

FIG. 2B illustrates the operations carried out by the panoramic video generation module 150 when receiving the second frame sequence portions SP2(*i*) from each video camera 105(*i*) during an operative phase starting at time instant t(n'+1) and ending at time instant t(N), i.e., from the beginning of the video conference when the actor is being shot until the end thereof.

For the sake of chariness and simplicity, FIGS. 2A and 2B make reference to a very simple case in which the plurality of video cameras 105(*i*) comprises only two video cameras 105(1) and 105(2) arranged in front of the actor, and located side-by-side, so as to define a left video camera (e.g., corresponding to the video camera 105(1)) and a right video camera (e.g., corresponding to the video camera 105(2)). However, similar considerations apply in case a different number of video cameras 105(*i*) are provided, and/or in case the video cameras are arranged according to different arrangements.

Making reference to FIG. 2A, according to an embodiment of the present invention, the first video frames F(1)(0) and F(2)(0) of both the two video cameras 105(1) and 105(2) (i.e., the video frames corresponding to time instant t(0)) are collected by the frame extractor module 120 and then scaled down (block 202) to a resolution which is sufficiently low to speed up the following computation operations and at the same time sufficiently high not to lose substantial details (e.g., a VGA-like resolution).

At this point, the scaled-down versions of the video frames F(1)(0) and F(2)(0) are subjected to a homographic transformation procedure (block 204) which provides for the following operations:

Identify in said scaled down video frames relevant key points for which position and scale are invariant with respect to affine transformations (rotation, translation, scale and brightness). Said relevant key points can be identified using known algorithm such as the SURF or SIFT algorithms disclosed in "*Automatic Panoramic Image Stitching using Invariant Features*" by M. Brown and D. Lowe, International Journal of Computer Vision, 74(1), pages 59-73, 2007, or the ALP algorithm disclosed in "*Localization accuracy of interest point detectors with different scale space representations*" by K. Cordes, B. Rosenhahn and J. Ostermann, in 2014 11th IEEE International Conference on Advanced Video and Signal Based Surveillance (AVSS).

A matching operation is then carried out among the relevant key points of the two scaled-down video frames in order to determine a corresponding homographic transformation. Said matching operation can be carried out according to known procedures such as the one disclosed in the already mentioned OpenCV 2.4.13.7 documentation page "*Image stitching*".

For each video camera 105(1) and 105(2) a respective set of homographic data HD(1), HD(2) is then generated based on said determined homographic transformation. Each set of homographic data HD(1), HD(2) comprises homographic information which describe the video cameras 105(1) and 105(2), respectively, i.e., the focal distances FD(1), FD(2) of the video cameras, the coordinates C(1), C(2) of the main points (i.e., optical center projection on the retinal plane) of the video cameras, and the affine transformation matrixes M(1), M(2) corresponding to the homographic transformation which allows to align the video frames F(1)(0), F(2)(0) one to another with respect to a same common reference system by mapping to each other common points of the video frames F(1)(0), F(2)(0) corresponding to overlapping portions of the fields of view of the video cameras 105(1) and 105(2).

A seam scale parameter SSP is then calculated as the average value of the focal distances FD(1), FD(2). The seam scale parameter SSP is the scale to be used during the following frame stitching procedures to reduce the number of visual artifacts. In order to obtain an optimized seam scale parameter SSP, the background of the shot scene could advantageously comprise geometric patterns to be used as a reference during the calibration of the video cameras 105(1), 105(2).

The scaling down and the homographic transformation procedures corresponding to blocks 202 and 204 are carried out by the background module 140.

Using the sets of homographic data HD(1), HD(2) and the seam scale parameter SSP previously calculated, the background module 140 applies a homographic transformation to the video frames F(1)(0) and F(2)(0) at their original resolutions (block 206) directed to align them one to another with respect to a same common reference system, so as to obtain corresponding transformed video frames WF(1)(0) and WF(2)(0).

According to an embodiment of the present invention, the transformed video frames WF(1)(0) and WF(2)(0) are subjected to a graph cut procedure 208, which provides for the generation of seam masks (referred to as "background seam masks" to underline that they have been obtained from video frames shooting background only, i.e., without shooting the actor) comprising graph cuts that subdivide the areas of the masks into remove portions and keep portions. The graph cut procedure 208 is carried out by the panoramic video generation module 150.

As already mentioned above, and as will be described in greater detail in the following of the present description, the system 100 according to an embodiment of the present invention is configured in such a way that during the second frame sequence portion SP2(*i*) (i.e., when the actor is shot), at each time t(n), a dominant video camera is selected among the video cameras 105(1), 105(2) based on the position of the actor with respect to the video cameras 105(1), 105(2).

If the first video camera 105(1) is selected to be the dominant one, (a processed version of) the video frame F(1)(*n*) will be stitched over the video frame F(2)(*n*) (in this case, the z-order of F(1)(*n*) is higher than the z-order of F(2)(n)). If instead the second video camera 105(2) is selected to be the dominant one, (a processed version of) the video frame F(2)(n) will be stitched over the video frame F(1)(n) (in this case, the z-order of F(2)(n) is higher than the z-order of F(1)(n)).

The graph cut procedure 208 according to an embodiment of the present invention takes into account this concept of dominant video camera and provides for using the transformed video frames WF(1)(0), WF(2)(0) to generate for each video camera 105(1), 105(2) a corresponding set SB(1), SB(2) of background seam masks to be used, during the second frame sequence portion SP2(i), every time the corresponding video camera is selected to be the dominant video camera.

More particularly, according to an embodiment of the present invention, a first set SB(1) of background seam masks is generated comprising two background seam masks $BSM_1(1)$, $BSM_1(2)$ to be exploited every time the video camera 105(1) is selected to be the dominant video camera, and a second set SB(2) of background seam masks is generated comprising two background seam masks $BSM_2(1)$, $BSM_2(2)$ to be exploited every time the video camera 105(2) is selected to be the dominant video camera.

As it will be described in detail in the following of the description, in order to stitch together video frames F(1)(n), F(2)(n) corresponding to time t(n) during the second frame sequence portion SP2(i):

if the video camera 105(1) is selected to be the dominant video camera, the first set SB(1) of background seam masks is employed, with the background seam mask $BSM_1(1)$ that is used to process the video frame F(1)(n) generated by the video camera 105(1) and the background seam mask $BSM_1(2)$ that is used to process the video frame F(2)(n) generated by the video camera 105(2);

if the video camera 105(2) is selected to be the dominant video camera, the second set SB(2) of background seam masks is employed, with the background seam mask $BSM_2(1)$ that is used to process the video frame F(1)(n) generated by the video camera 105(1) and the background seam mask $BSM_2(2)$ that is used to process the video frame F(2)(n) generated by the video camera 105(2).

According to an embodiment of the present invention, the background seam masks $BSM_1(1)$, $BSM_1(2)$, $BSM_2(1)$, $BSM_2(2)$ are generated using one of the graph cut procedures known in the art—i.e. by scanning overlapping pixels in the transformed video frames WF(1)(0), WF(2)(0) and calculating the graph cut which causes the lowest junction distortions through the minimization of a cost function regarding the Euclidean distance among pixels astride the graph cut—suitably modified to take into account the z-order to be employed during the stitching procedure given by the camera dominance. For example, the background seam masks can be calculated through a modified version of the procedure described in the abovementioned document "*Graphcut Textures: Image and Video Synthesis Using Graph Cuts*" by Vivek Kwatra et al.

More specifically, according to an embodiment of the present invention:

the graph cuts of the background seam masks $BSM_1(1)$, $BSM_1(2)$ of the first set SB(1) are calculated by taking into account that such masks will be used for stitching procedures in which a video frame F(1)(n) generated by the video camera 105(1) will be overlapped to (superimposed on) a video frame F(2)(n) generated by the video camera 105(2) (case in which the z-order of the video frame F(1)(n) is higher than the z-order of the video frame F(2)(n));

the graph cuts of the background seam masks $BSM_2(1)$, $BSM_2(2)$ of the second set SB(2) are calculated by taking into account that such masks will be used for stitching procedures in which a video frame F(2)(n) generated by the video camera 105(2) will be overlapped to (superimposed on) a video frame F(1)(n) generated by the video camera 105(1) (case in which the z-order of the video frame F(2)(n) is higher than the z-order of the video frame F(1)(n)).

Moreover, according to an embodiment of the present invention, in order to reduce the occurrence of artifacts and/or distortions that could potentially arise when the actor is positioned astride the transformed video frames WF(1)(0), WF(2)(0), the graph cut used for the generation of the background seam masks $BSM_1(1)$, $BSM_1(2)$, $BSM_2(1)$, $BSM_2(2)$ may be advantageously limited to portions of the seam masks corresponding to portions of the transformed video frames WF(1)(0), WF(2)(0) that are intended to overlap to each other.

Making reference to the case illustrated in FIGS. 2A, 2B, which provides for a left video camera 105(1) and a right video camera 105(2), the graph cut will be limited to a portion of the video frame WF(1)(0) corresponding to the vertical border on the right thereof and to a left portion of the video frame WF(2)(0) corresponding to the vertical border on the left thereof.

Figure 3A:
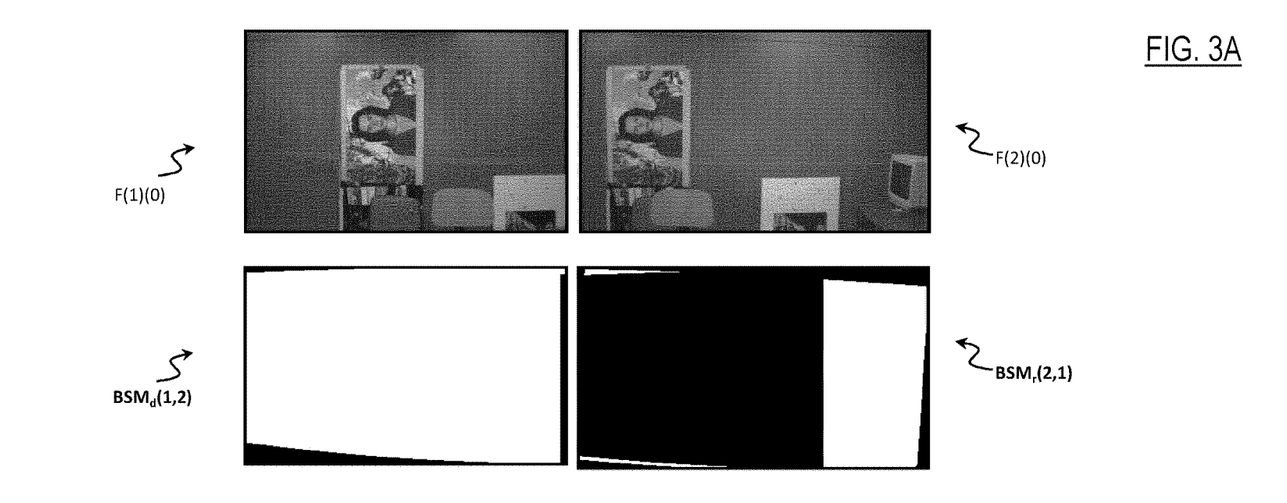
FIGS. 3A and 3B illustrate an example of background seam masks generated by the panoramic video communication system of FIG. 1 according to embodiments of the present invention.
Figure 3B:
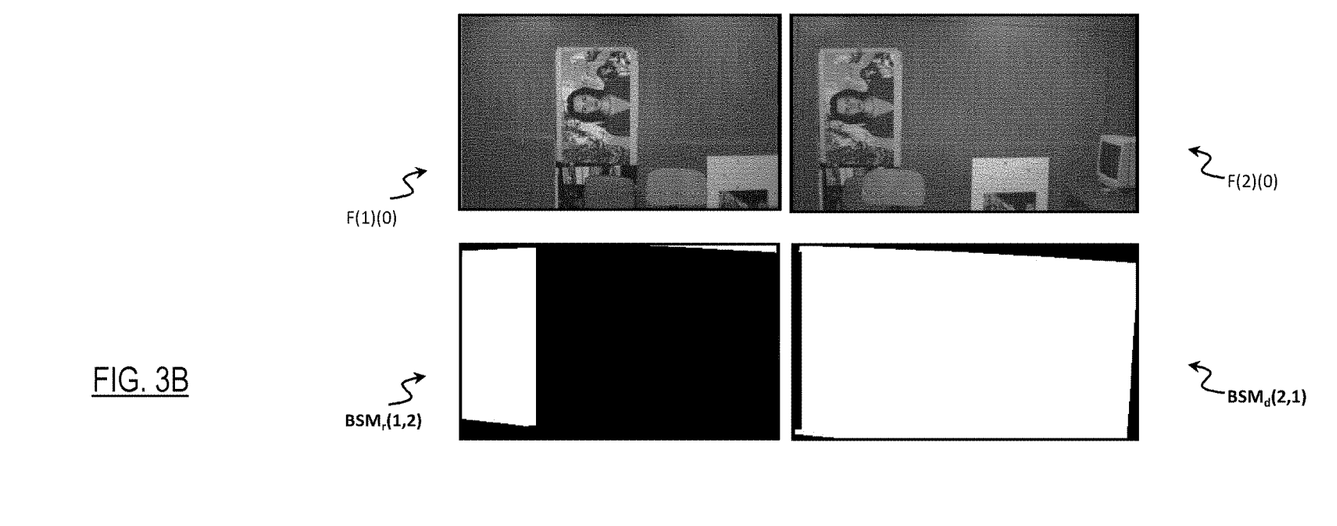

FIGS. 3A and 3B illustrate an example of a first set SB(1) of background seam masks $BSM_1(1)$, $BSM_1(2)$ and a second set SB(2) of background seam masks $BSM_2(1)$, $BSM_2(2)$ generated using the graph cut procedure 208 according to embodiments of the present invention starting from two exemplary video frames F(1)(0) and F(2)(0).

FIG. 3A illustrates the case in which the video camera 105(1) which generated the video frame F(1)(0) is dominant with respect to the video camera 105(2), while FIG. 3B illustrates the case in which the video camera 105(2) which generated the video frame F(2)(0) is dominant with respect to the video camera 105(1).

The background seam masks $BSM_1(1)$ and $BSM_2(1)$ are configured to be used with (transformed versions of) video frames F(1)(n), while the background seam masks $BSM_1(2)$, $BSM_2(2)$ are configured to be used with (transformed versions of) video frames F(2)(n). The remove portions of the background seam masks $BSM_1(1)$, $BSM_1(2)$, $BSM_2(1)$, $BSM_2(2)$ are depicted in black, while the keep portions of the background seam masks $BSM_1(1)$, $BSM_1(2)$, $BSM_2(1)$, $BSM_2(2)$ are depicted in white.

Returning back to FIG. 2A, during the preliminary phase, the video frames F(1)(0), F(1)(1), . . . , F(1)(n') of the first frame sequence portion SP1(1) corresponding to the video camera 105(1) are collected and statistically processed in order to calculate a first average background ABF(1) corresponding to the average of the video frames F(1)(0), F(1)(1), . . . , F(1)(n'), and a first background variance VBF(1) corresponding to the variance of the video frames F(1)(0), F(1)(1), . . . , F(1)(n') (block 210). Similarly, during the preliminary phase, the video frames F(2)(0), F(2)(1), . . . , F(2)(n') of the first frame sequence portion SP1(2) corresponding to the video camera 105(2) are collected and statistically processed in order to calculate a second average background ABF(2) corresponding to the average of the video frames F(2)(0), F(2)(1), . . . , F(2)(n'), and a second background variance VBF(2) corresponding to the variance of the video frames F(2)(0), F(2)(1), . . . , F(2)(n') (block 212). According to an embodiment of the present invention, the operations corresponding to blocks 210 and 212 can be directly carried out by the panoramic video generation module 150, or can be carried out by a dedicated statistical analysis module (not illustrated in FIG. 1).

It is underlined that while in the exemplary embodiment illustrated in FIG. 2A, the generation of the sets of homographic data HD(1), HD(2), the seam scale parameter SSP and the sets SB(1), SB(2) of background seam masks has been carried out by processing the first video frames F(1)(0) and F(2)(0) of both the two video cameras 105(1) and 105(2) (i.e., the video frames corresponding to time instant t(0)), similar considerations apply in case video frames corresponding to a different time instant of the preliminary phase are used, such as for example the frames F(1)(1) and F(2)(1) corresponding to time instant t(1).

Passing now to FIG. 2B, each time a new video frame F(1)(n) belonging to the second frame sequence portion SP2(1) and generated by the video camera 105(1) at time t(n) is received by the panoramic video generation module 150, the generation module 150 generates a corresponding operative seam mask SM(1,n) (block 230) to be applied to (a transformed version of) said video frame F(1)(n).

Similarly, each time a new video frame F(2)(n) belonging to the second frame sequence portion SP2(2) and generated by the video camera 105(2) at time t(n) is received by the panoramic video generation module 150, the panoramic video generation module 150 generates a corresponding operative seam mask SM(2,n) to be applied to (a transformed version of) said video frame F(2)(n) (block 232).

The operative seam masks SM(1,n), SM(2,n) are generated according to one of the graph cut procedures known in the art, by scanning overlapping pixels in the video frames F(1)(n), F(2)(n) and calculating the graph cut which causes the lowest junction distortions through the minimization of a cost function regarding the Euclidean distance among pixels astride the graph cut.

Using the sets of homographic data HD(1), HD(2) and the seam scale parameter SSP previously calculated, a homographic transformation is then applied to the video frames F(1)(n) and F(2)(n) (block 234) directed to align them one to another with respect to the same common reference system employed for the generation of the background seam masks (see FIG. 2A), so as to obtain corresponding transformed video frames WF(1)(n) and WF(2)(n).

Then, using the sets of homographic data HD(1), HD(2) previously calculated, the operative seam masks SM(1,n) and SM(2,n) are subjected to a homographic transformation directed to align them one to another with respect to the same common reference system employed for the generation of the transformed video frames WF(1)(n) and WF(2)(n) and background seam masks (block 236), so as to obtain corresponding transformed operative seam masks WSM(1,n) and WSM(2,n).

According to an embodiment of the present invention, the transformed video frames WF(1)(n) and WF(2)(n) are stitched to each other by using the operative masks SM(1,n) and SM(2,n) suitably modified according to the background seam masks included in the set SB(i) of background seam masks corresponding to the dominant video camera 105(i).

For this purpose, according to an embodiment of the present invention, the panoramic video generation module 150 carries out a video camera dominance assessing procedure (block 240) for assessing which one between the video camera 105(1) and 105(2) is the dominant video camera at time instant t(n). The video camera dominance assessing procedure according to an embodiment of the present invention provides for processing the video frames F(1)(n) and F(2)(n) using statistical data regarding the background collected during the first frame sequence portion SP1(1) (i.e., the first average background ABF(1), the second average background ABF(2), the first background variance VBF(1), and the second background variance VBF(2)), and comprises the following operations.

Firstly, each one of the video frames F(1)(n), F(2)(n) is processed in order to identify outlines of the objects depicted in the foreground, and particularly the actor.

For this purpose, each one of the video frames F(1)(n), F(2)(n) is processed for calculating a corresponding actor seam mask ASM(1)(n), ASM(2)(n) directed to outline the actor using one of the background subtraction procedures known in the art, such as for example the one described in the already mentioned paper "*Improved Adaptive Gaussian Mixture Model for Background Subtraction*" by Zoran Zivkovic, Intelligent and Autonomous Systems Group, University of Amsterdam, The Netherlands, In Proc. ICPR, 2004.

Figure 4:
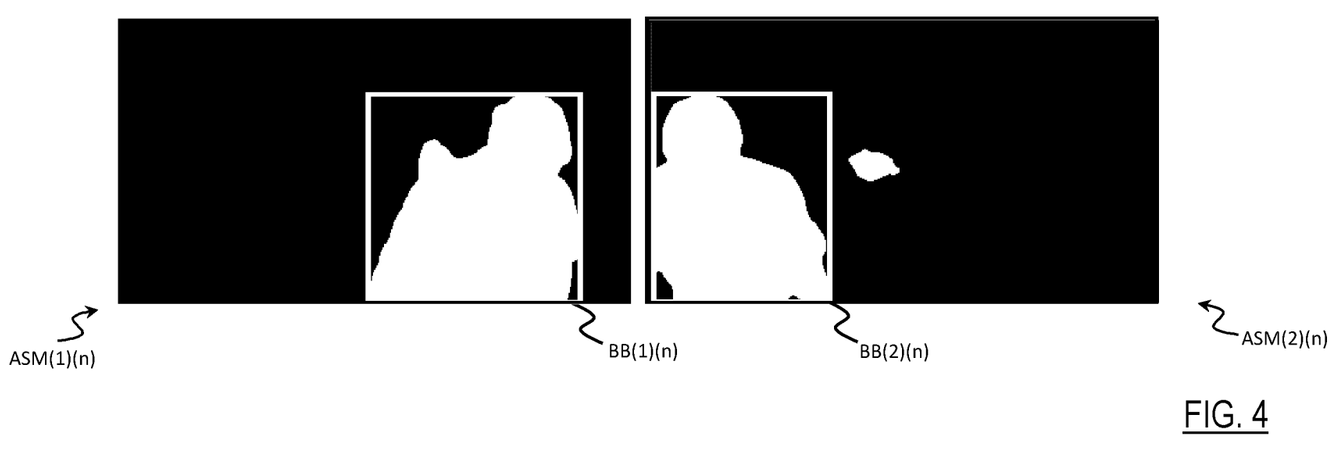
FIG. 4 illustrates an example of actor seam masks generated by the panoramic video communication system of FIG. 1 according to embodiments of the present invention.

Each one of the actor seam masks ASM(1)(n), ASM(2)(n) (an example of which is depicted in FIG. 4) has keep portions (depicted in white in FIG. 4) that outline objects depicted in the foreground (comprising the actor) in the corresponding video frame F(1)(n), F(2)(n).

Then, the background is subtracted from each one of the video frames F(1)(n), F(2)(n) by exploiting the actor seam masks ASM(1)(n), ASM(2)(n) and the statistical data regarding the background which were collected during the first frame sequence portion SP1(i), i.e., the first average background ABF(1), the second average background ABF(2), the first background variance VBF(1), and the second background variance VBF(2). The results of these subtraction operations are then advantageously subjected to Gaussian blur, threshold comparison, erosion and dilation procedures, in order to identify the contours of the foreground objects.

At this point, for each one of the processed video frames F(1)(n), F(2)(n), bounding boxes are calculated each one enclosing one of foreground objects previously identified. Then, for each one of the processed video frames F(1)(n), F(2)(n), the largest bounding box BB(1)(n), BB(2)(n) (referred to as "dominant bounding box") is selected. In this way, it is assured with a high degree of reliability that the resulting dominant bounding box BB(1)(n), BB(2)(n) obtained from each processed video frame F(1)(n), F(2)(n) encloses the actor, and not other objects which were mistakenly identified as foreground objects, such as shadows and/or glares.

According to an embodiment of the present invention, the selection of the dominant video camera at time t(n) is carried out by comparing to each other the area of the calculated dominant bounding box BB(1)(n), BB(2)(n) and then selecting the dominant video camera as the one which generated the video frame F(1)(n), F(2)(n) corresponding to the dominant bounding box BB(1)(n), BB(2)(n) having the largest area. Making reference to the example illustrated in FIG. 4, the dominant video camera is the video camera 105(1) (left camera), since the largest dominant bounding box is the dominant bounding box BB(1)(n).

In order to avoid or at least reduce the possibility that the result of decision regarding the assessed dominant video camera 105(1) rapidly oscillates (for example when the actor is moving astride the border of the field of views of adjacent video cameras) causing an alternation of video artefacts, a majority time filtering procedure with hysteresis is applied (block 250) to the result of the video camera dominance assessing procedure corresponding to block 240.

Based on the output of the (filtered) video camera dominance assessing procedure, a selected set SB(i') (comprising background seam masks BSM(1) and BSM(2)) is selected between the first set SB(1) or the second set SB(2) of background seam masks (block 260). Particularly, if the video camera 105(1) is assessed to be the dominant video camera at the time instant t(n), the selected set SB(i') of background seam masks is the first set SB(1), with BSM(1) =BSM$_1$(1) and BSM(2)=BSM$_1$(2), while if the video camera 105(2) is assessed to be the dominant video camera at the time instant t(n), the selected set SB(i') of background seam masks is the second set SB(2), with BSM(1)=BSM$_2$(1) and BSM(2)=BSM$_2$(2).

According to an embodiment of the present invention, the selected background seam masks BSM(1) and BSM(2) are then advantageously expanded and resized (block 265), and the panoramic video generation module 150 generates the actual seam masks (referred to as "final masks" or "combined masks") to be applied to (the transformed versions of) the processed video frames F(1)(n), F(2)(n) for the stitching thereof by combining the transformed operative seam masks WSM(1,n), WSM(2,n) with the background seam masks BSM(1), BSM(2) of the selected set SB(i') corresponding to the dominant video camera (280).

According to an embodiment of the present invention, the transformed operative seam mask WSM(1,n) and the selected background seam mask BSM(1) are combined to each other through a logic AND operation, so as to obtain a corresponding first final mask M(1) comprising keep portions located only where there is an overlap between keep portions of the transformed operative seam mask WSM(1,n) and keep portions of the selected background seam mask BSM(1), and the transformed operative seam mask WSM (2,n) and the selected background seam mask BSM(2) are combined to each other through a logic AND operation, so as to obtain a corresponding second final mask M(2) comprising keep portions located only where there is an overlap between keep portions of the transformed operative seam mask WSM(2,n) and keep portions of the selected background seam mask BSM(2).

The resulting final masks M(1), M(2) obtained by mixing the operative seam masks WSM(1,n), WSM(2,n) calculated from the video frames F(1)(n), F(2)(n) corresponding to the time t(n) with the background seam mask BS(1), BS(2) of the set corresponding to the video camera that at time t(n) has been identified to be the dominant video camera have the advantage to include graph cuts that do not involve portions of the video frames F(1)(n), F(2)(n) wherein the actor is located. In this way, it is possible to advantageously avoid, or at least reduce, the amount of distortions/artifacts affecting the actor in the final panoramic video frame.

Figure 5:
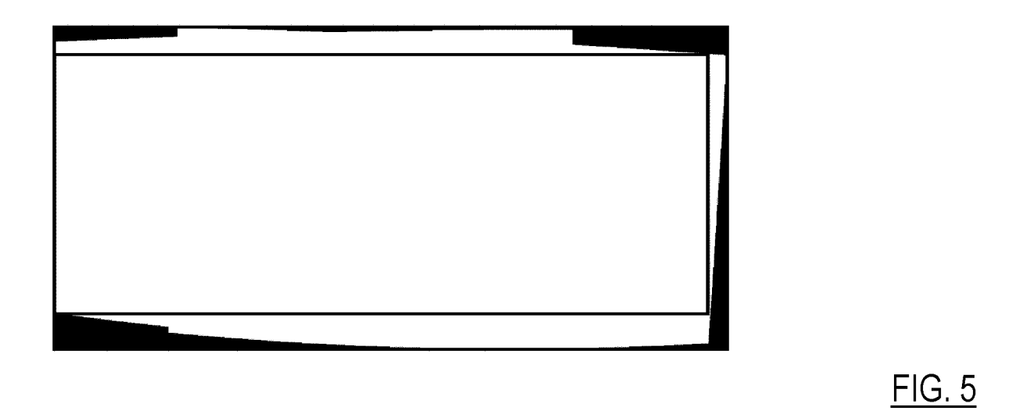
FIG. 5 illustrates an example of a stitching mask generated by the panoramic video communication system of FIG. 1 according to embodiments of the present invention.

The transformed video frames WF(1)(n) and WF(2)(n) are then stitched to each other by the panoramic video generation module 150 through a multiband blender procedure (block 282) using the final masks M(1), M(2) to obtain a stitched frame F(n). For this purpose, a stitching mask is generated from the final masks M(1), M(2) (an example of which is illustrated in FIG. 5), the transformed video frames WF(1)(n) and WF(2)(n) are overlapped according to the z-order corresponding to the assessed dominant video camera (i.e., WF(1)(n) is overlapped to WF(2)(n) if the dominant video camera is the video camera 105(1) and WF(2)(n) is overlapped to WF(1)(n) if the dominant video camera is the video camera 105(2)) and said stitching mask is employed in one of the known multiband blending procedures known in the art is carried out, such as the one disclosed in the OpenCV 2.4.13.7 page "Image stitching" available at http://docs.opencv.org/2.4/modules/stitching/doc/introduction-.html or the one disclosed in the already mentioned paper "*A Multiresolution Spline with Application to Image Mosaics*" by Peter J. Burt and Edward H. Adelson, RCA David Sarnoff Research Center, ACM Transactions on Graphics, Vol. 2, No. 2, October 1983.

The resulting stitched frame F(n) is then subjected to a cropping operation (block 284) directed to crop the image portion included in the largest rectangle completely included in the stitching mask to obtain a corresponding panoramic video frame PV(n).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in other embodiments.

For example, although the embodiments of the description that have been described in detail mainly make reference to a simple case in which the plurality of video cameras comprises only two video cameras, and particularly a left video camera and a right video camera, the concepts of the present invention can be applied to more general cases in which more than two video cameras are used.

In this case, in order to reduce the occurrence of artifacts and/or distortions that could potentially arise when the actor is positioned astride the field of views of different cameras, the graph cut used for the generation of the background seam masks can be advantageously limited to the portions (borders) of the seam masks that correspond to overlapping field of views among adjacent video cameras.

When more than two video cameras are used, a homographic transformation can be carried out for each pair of video cameras. Then, a global minimization procedure can be used for determining the set of homographic transformations that minimizes stitching artifacts, for example using a cost function that accumulates the Euclidean distances of the pixels astride the graph cut. In an alternative embodiment of the invention, a preferential video camera is selected among the plurality of video cameras, and an invariant transformation is imposed for this preferential video camera. Starting from the preferential video camera, homographic transformations of the adjacent video cameras are calculated such to keep unvaried the homographic transformation of the already considered video cameras.

When more than two video cameras are used, the same video camera dominance assessing procedure described for the two video cameras case is used to assess which is the video camera that has the best point of view of the actor. This video camera is assessed to have the highest dominance. The remaining video cameras are then sequentially scanned by moving away from the video camera having the highest dominance, and the dominance is set in a relative way.

The invention claimed is:

1. A video communication system adapted to be interfaced with a plurality of video cameras for receiving respective video signals therefrom, comprising:
one more computing devices having memory storing application software that, when executed, causes the video communication system to:
extract from each video signal received from the video cameras a corresponding sequence of video frames, each sequence of video frames comprising a first sequence portion comprising background video frames shooting background only and a subsequent second sequence portion comprising video frames shooting a foreground subject;
receive the video frames of the second sequence portion of each sequence of video frames;
every time new video frames of the second sequence portion of each sequence of video frames are received:
select a corresponding dominant video camera among the plurality of video cameras based on the received new video frames, the dominant video camera being the video camera having a best point of view of the foreground subject, and
process the received new video frames to generate corresponding operative seam masks to be used for stitching together the new video frames;
receive the background video frames of the first sequence portion of each sequence of video frames and to generate for each video camera a corresponding set of background seam masks according to the received background video frames, wherein:
each seam mask among the operative seam masks and background seam masks has a respective area and comprises a graph cut subdividing area of the seam mask into:
remove area portions defining, when the seam mask is superimposed on a video frame, corresponding area portions of the video frame to be cut out for being removed, and
keep area portions defining, when the seam mask is superimposed on a video frame, corresponding area portions of the video frame to be kept,
each set of background seam masks corresponding to a video camera comprises background seam masks to be used for stitching together video frames of the second sequence portion when the video camera is selected as the dominant video camera, wherein each set of background seam masks is generated through a graph cut procedure providing for:
scanning overlapping pixels in the background video frames, and
calculating the graph cut which causes lowest junction distortions through minimization of a cost function regarding a Euclidean distance among pixels astride the graph cut;
every time new video frames of the second sequence portion of each sequence of video frames are received:
select the set of background seam masks corresponding to the dominant video camera;
generate combined masks by combining the background seam masks of the selected set with the operative seam masks; and
generate a panoramic video frame by stitching together the received new video frames by removing therefrom area portions using the combined masks.

2. The video communication system of claim 1, wherein the application software further causes the video communication system to:
process the received new video frames to generate corresponding operative seam masks through a graph cut procedure providing for scanning overlapping pixels in the received new video frames and calculating a graph cut which causes lowest junction distortions through minimization of a cost function regarding a Euclidean distance among pixels astride the graph cut.

3. The video communication system of claim 1, wherein the application software further causes the video communication system to:
generate the panoramic video frame by overlapping the received new video frames with the received new video frame corresponding to the dominant video camera having a z-order higher than the z-order of the other received new video frames.

4. The video communication system of claim 1, wherein the graph cut procedure is modified to take into account that video frames corresponding to the video camera corresponding to the set of background seam masks have a z-order higher than the z-order of video frames corresponding to other video cameras.

5. The video communication system of claim 4, wherein the graph cut procedure provides for limiting the graph cut to portions of background video frames that are intended to overlap each other.

6. The video communication system of claim 1, wherein the application software further causes the video communication system to:
generate the combined masks by carrying out a logic AND operation between the background seam masks of the selected set and the operative seam masks.

7. The video communication system of claim 1, wherein the application software further causes the video communication system to:
select a corresponding dominant video camera among the plurality of video cameras based on the received new video frames by:
calculating for each video frame among, the received new video frames, bounding boxes each bounding box enclosing a foreground object identified in the video frame;
identifying the video frame comprising the bounding box having the largest area among the received new video frames; and
selecting the dominant video camera as the video camera corresponding to the identified video frame comprising the bounding box having the largest area.

8. The video communication system of claim 1, wherein the application software further causes the video communication system to:
transmit the panoramic video frame to a receiver module.

9. A method for generating a panoramic video, comprising:
receiving video signals each one from a respective video camera among a plurality of video cameras;
extracting from each received video signal a corresponding sequence of video frames, each sequence of video frames comprising a first sequence portion comprising background video frames shooting background only and a subsequent second sequence portion comprising video frames shooting a foreground subject;

for every new video frame of the second sequence portion of each sequence of video frames:
  select a corresponding dominant video camera among the plurality of video cameras based on the new video frames, the dominant video camera being the video camera having a best point of view of the foreground subject, and
  process the new video frames to generate corresponding operative seam masks to be used for stitching together the new video frames;
generating for each video camera a corresponding set of background seam masks according to the background video frames, wherein:
each seam mask among the operative seam masks and background seam masks has a respective area and comprises a graph cut subdividing area of the seam mask into:
remove area portions defining, when the seam mask is superimposed on a video frame, corresponding area portions of the video frame to be cut out for being removed, and
keep area portions defining, when the seam mask is superimposed on a video frame, corresponding area portions of the video frame to be kept,
  each set of background seam masks corresponding to a video camera comprises background seam masks to be used for stitching together video frames of the second sequence portion when the video camera is selected as the dominant video camera, wherein each set of background seam masks is generated through a graph cut procedure providing for:
    scanning overlapping pixels in the background video frames, and
    calculating the graph cut which causes lowest junction distortions through minimization of a cost function regarding a Euclidean distance among pixels astride the graph cut, the method further comprising:
for every new video frame of the second sequence portion of each sequence of video frames:
select the set of background seam masks corresponding to the dominant video camera;
generate combined masks by combining the background seam masks of the selected set with the operative seam masks; and
generate a panoramic video frame by stitching together the new video frames by removing therefrom area portions using the combined masks.

10. The method of claim 9, further comprising processing the new video frames to generate corresponding operative seam masks through a graph cut procedure providing for scanning overlapping pixels in the new video frames and calculating a graph cut which causes lowest junction distortions through minimization of a cost function regarding a Euclidean distance among pixels astride the graph cut.

11. The method of claim 9, further comprising generating the panoramic video frame by overlapping the new video frames with the new video frame corresponding to the dominant video camera having a z-order higher than the z-order of the other new video frames.

12. The method of claim 9, wherein the graph cut procedure is modified to take into account that video frames corresponding to the video camera corresponding to the set of background seam masks have a z-order higher than the z-order of video frames corresponding to other video cameras.

13. The method of claim 12, wherein the graph cut procedure provides for limiting the graph cut to portions of background video frames that are intended to overlap each other.

14. The method of claim 9, further comprising generating the combined masks by carrying out a logic AND operation between the background seam masks of the selected set and the operative seam masks.

15. The method of claim 9, further comprising:
selecting a corresponding dominant video camera among the plurality of video cameras based on the new video frames by:
  calculating for each video frame among, the new video frames, bounding boxes each bounding box enclosing a foreground object identified in the video frame;
  identifying the video frame comprising the bounding box having the largest area among the new video frames; and
  selecting the dominant video camera as the video camera corresponding to the identified video frame comprising the bounding box having the largest area.

16. The method of claim 9, further comprising transmitting the panoramic video frame to a receiver module.

17. A non-transitory computer readable media storing executable programming instructions of application software stored thereon that, when executed by a video communication system, cause the video communication system to:
extract from each video signal received from a plurality of video cameras a corresponding sequence of video frames, each sequence of video frames comprising a first sequence portion comprising background video frames shooting background only and a subsequent second sequence portion comprising video frames shooting a foreground subject;
receive the video frames of the second sequence portion of each sequence of video frames;
every time new video frames of the second sequence portion of each sequence of video frames are received:
  select a corresponding dominant video camera among the plurality of video cameras based on the received new video frames, the dominant video camera being the video camera having a best point of view of the foreground subject, and
  process the received new video frames to generate corresponding operative seam masks to be used for stitching together the new video frames;
receive the background video frames of the first sequence portion of each sequence of video frames and to generate for each video camera a corresponding set of background seam masks according to the received background video frames, wherein:
each seam mask among the operative seam masks and background seam masks has a respective area and comprises a graph cut subdividing area of the seam mask into:
remove area portions defining, when the seam mask is superimposed on a video frame, corresponding area portions of the video frame to be cut out for being removed, and
keep area portions defining, when the seam mask is superimposed on a video frame, corresponding area portions of the video frame to be kept,
  each set of background seam masks corresponding to a video camera comprises background seam masks to be used for stitching together video frames of the second sequence portion when the video camera is selected as the dominant video camera, wherein each set of background seam masks is generated through a graph cut procedure providing for:
  scanning overlapping pixels in the background video frames, and
  calculating the graph cut which causes lowest junction distortions through minimization of a cost function regarding a Euclidean distance among pixels astride the graph cut; and
every time new video frames of the second sequence portion of each sequence of video frames are received:
  select the set of background seam masks corresponding to the dominant video camera;
  generate combined masks by combining the background seam masks of the selected set with the operative seam masks; and
  generate a panoramic video frame by stitching together the received new video frames by removing therefrom area portions using the combined masks.

18. The non-transitory computer readable media of claim 17, wherein the executable programming instructions of the application software further cause the video communication system to:
  process the received new video frames to generate corresponding operative seam masks through a graph cut procedure providing for scanning overlapping pixels in the received new video frames and calculating a graph cut which causes lowest junction distortions through minimization of a cost function regarding a Euclidean distance among pixels astride the graph cut.

19. The non-transitory computer readable media of claim 17, wherein the executable programming instructions of the application software further cause the video communication system to:
  generate the panoramic video frame by overlapping the received new video frames with the received new video frame corresponding to the dominant video camera having a z-order higher than the z-order of the other received new video frames.

20. The non-transitory computer readable media of claim 17, wherein the graph cut procedure is modified to take into account that video frames corresponding to the video camera corresponding to the set of background seam masks have a z-order higher than the z-order of video frames corresponding to other video cameras.

* * * * *